No. 730,371. PATENTED JUNE 9, 1903.
E. M. HEWLETT.
REVERSE CURRENT RELAY.
APPLICATION FILED FEB. 3, 1902.
NO MODEL.
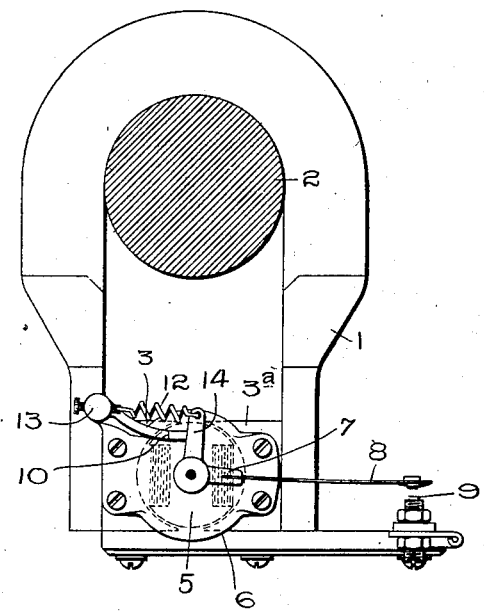
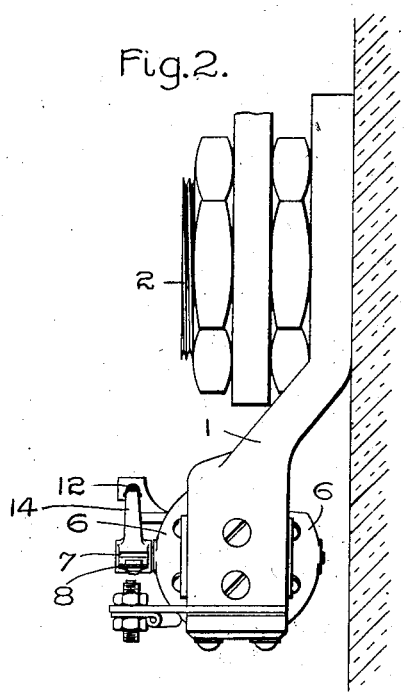
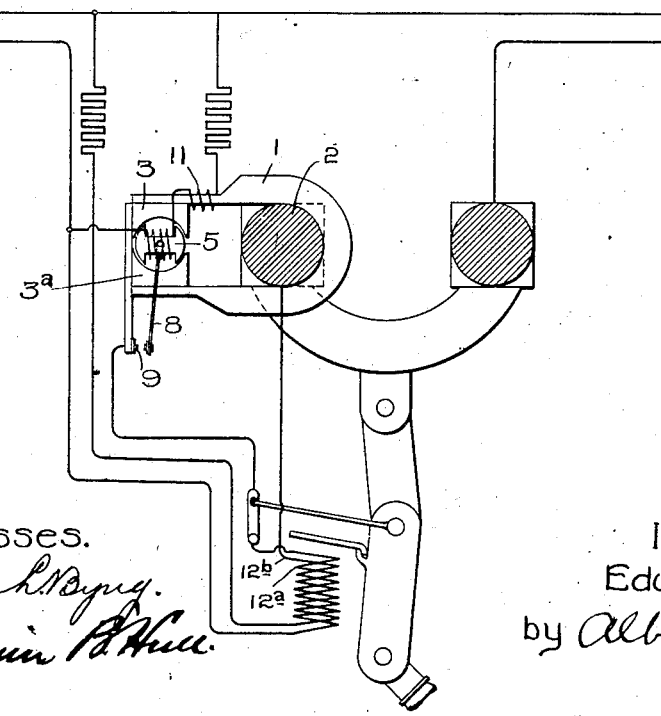
Witnesses.
Marcus L. Byng.
Benjamin B. Hull.
Inventor.
Edward M. Hewlett.
by Albert G. Davis
Atty.

No. 730,371. Patented June 9, 1903.

UNITED STATES PATENT OFFICE.

EDWARD M. HEWLETT, OF SCHENECTADY, NEW YORK, ASSIGNOR TO GENERAL ELECTRIC COMPANY, A CORPORATION OF NEW YORK.

REVERSE-CURRENT RELAY.

SPECIFICATION forming part of Letters Patent No. 730,371, dated June 9, 1903.

Application filed February 3, 1902. Serial No. 92,319. (No model.)

*To all whom it may concern:*

Be it known that I, EDWARD M. HEWLETT, a citizen of the United States, residing at Schenectady, county of Schenectady, State of New York, have invented certain new and useful Improvements in Reverse-Current Relays, of which the following is a specification.

The object of this invention is to provide a device which will respond to reversal in direction of energy-flow in electric circuits, and which will be as simple as practicable in construction and reliable in operation. Devices of this kind are known in the art as "reverse-current relays," sometimes called "reversal relays," and are essential to protect alternating dynamos running in parallel, circuits containing storage batteries where sometimes in case of low generator voltage the battery discharges and causes a reversal of energy-flow, and alternating-current systems of distribution. It is desirable that an instrument of this character shall not be affected by overload or underload current, but that it shall respond readily to a reversal of the direction of energy-flow. It is desirable, moreover, that it may be rendered sensitive to different degrees of reversal, so to speak—that is to say, to different values of the reversal current—so as to adapt it to indicate different predetermined degrees of irregularity in the circuits which it controls.

I construct a device of this character by mounting the movable element of the device, as the armature, in such a position with relation to the field-magnet that it is in a condition of maximum torque, but movement in one direction is resisted by a fixed stop against which it is held until a reversal of current in the series conductor occurs, upon which reversal a quick and strong movement of the armature occurs by reason of the magnetic relation aforesaid. In order to simplify the construction, I preferably dispense with a series coil, employing for the magnetizing agent of the field-core the conducting-stud of the circuit-breaker on the switchboard. The heavy currents carried in circuits in which devices of this type are commonly employed are sufficient to furnish in this way all the magnetization required for the operation of the relay. I may therefore simply surround one of the conducting-studs of the circuit with an iron yoke, at the open ends of which an armature is mounted on which is wound a coil connected in potential relation to the circuit, but I prefer to wind on the field-core a coil included in a constant circuit—as, for example, in the same potential branch as the armature coil—the coil being wound to oppose the stud magnetization, and by reason of such an organization the relay is sensitive to much lower reverse-currents.

The novel features will be more fully hereinafter described, and definitely indicated in the appended claims.

In the accompanying drawings, Figure 1 is a part-sectional view of an instrument embodying my improvements. Fig. 2 is a side elevation, and Fig. 3 is a diagram showing the circuit connections with a protected circuit.

Referring first to Fig. 1, 1 represents an iron core in horseshoe shape, adapted to inclose at the curved or yoke end a conducting-stud, such as 2 in Fig. 2, on a switchboard controlling the circuit to be protected. Between the open ends of the yoke are supported pole-pieces 3 $3^a$, machined to form a cylindrical gap, in which may turn an I-armature 5, supported in non-magnetic journals, such as 6. The spindle of the armature carries a lever 7, provided with a silver or other suitable contact on the end of a flexible tongue 8. A fixed contact 9 is mounted on a supporting-standard secured to an insulating-bar carried by the iron frame. The contacts may cut in a local circuit, including a trip-coil to open a circuit-breaker in the controlled circuit. A lug 10, cast integral with the non-magnetic journal 6, acts as a stop for the armature in its open position, and it is so set with relation to the armature that the poles of the latter are in a position of maximum torque when the trip-circuit is open, as indicated in Figs. 1 and 3. The armature is provided with a winding suitable for connection across the circuit to be controlled, thus being, when connected, in potential relation to the circuit, and current may be graduated by a resistance, as indicated in Fig. 3. In the same potential branch is included a coil 11 on the iron core of the field, connected to oppose the normal magnetic flux due to the stud of the circuit-breaker, by reason of which the sensitiveness of the device to reversal with low currents is greatly enhanced, since when the current through the circuit reverses the full magnetizing value of the opposing coil 11 is realized. By means of this, moreover, the degree of reversal, so to speak, or, more accurately, the strength of the reverse flow of current, may be predetermined and the relay calibrated to operate on a particular current condition. The relay is shown shifted to its open position in the figures. It will be seen that the armature stands in symmetrical relation to both pole-pieces of the core, its major axis being at right angles to the field-poles. It will be evident, therefore, that either an increase or decrease of the flux cannot turn the armature, but that a reversal of the direction of current in the stud 2, and therefore a reversal in the direction of the magnetic flux, will shift the armature to a position at right angles to that indicated in Fig. 3, the core 5 being polarized, as already stated, by the potential circuit and the coil 11 now being assisted by the stud in creating magnetic flux. I provide also a retractile spring 12, connected to a fixed stud 13 and an angular extension 14 of the relay-tongue, by which the armature is biased toward an open position of the relay-contacts. The circuit-breaker may be provided with the usual overload-coil to insure opening under dangerous currents. 12ª 12ᵇ represent the relay trip-coil and the overload-coil, respectively. Thus it will be seen that the relation of the parts described prevents any movement of the relay so as to change the circuit connections with either an overload or underload condition obtaining in the circuit, the armature being forced more firmly against the back-stop under overload conditions. In case of a reversal of direction of current, however slight, the armature is in a condition to respond most effectively to the current, and the opposing coil on the field-magnet at the instant of reversal obtains its full effect and operates the armature with certainty and sufficient force to effect a good contact in the tripping-circuit.

What I claim as new, and desire to secure by Letters Patent of the United States, is—

1. A reverse-current device comprising a bent core surrounding a conducting-stud, an armature pivoted in the field of the core, a potential coil carried by the armature, and a stop arresting the armature in its open position with its poles in a ninety-degree relation to the field-poles.

2. A reverse-current device comprising a magnet polarized by a conductor in series relation to the circuit controlled, an armature therefor normally held against a back-stop with its major axis at right angles to the polar axis of the magnet, a retractile agency for the armature, and means for developing a magnetic flux in the field-core opposing the flux due to the series excitation.

3. A reverse-current device comprising a magnet polarized by a conductor in series relation to the circuit controlled, an armature therefor normally held against a back-stop with its major axis at right angles to the polar axis of the magnet, a retractile agency for the armature, means for polarizing the armature, and means for developing a magnetic flux in the field-core opposing the flux due to the series excitation.

4. A reverse-current relay comprising an iron core adapted to encircle a current-carrying stud, a coil on the same to oppose but not overcome the stud magnetization, and an armature controlled by reversal of magnetic flux.

5. A reverse-current relay comprising a magnetizable core adapted to encircle a current-carrying stud, means for opposing the magnetic flux due to the stud, and a polarized armature controlled by the flux.

6. A reverse-current device comprising two relatively movable members, one polarized by the current which controls the device, and the other having a constant polarization, and a coil on the former member normally opposing the action of the controlling-current.

In witness whereof I have hereunto set my hand this 31st day of January, 1902.

EDWARD M. HEWLETT.

Witnesses:
 BENJAMIN B. HULL,
 MARGARET E. WOOLLEY.